United States Patent [19]

Login et al.

[11] 4,315,969
[45] * Feb. 16, 1982

[54] LINEAR SATURATED POLYESTERS OF PHOSPHORIC ACID AND HALOGENATED DIOLS AS FLAME-RETARDANT ADDITIVES AND COATINGS

[75] Inventors: Robert B. Login; David D. Newkirk, both of Woodhaven, Mich.

[73] Assignee: BASF Wyandotte Corporation, Wyandotte, Mich.

[ * ] Notice: The portion of the term of this patent subsequent to Feb. 16, 1999, has been disclaimed.

[21] Appl. No.: 59,435

[22] Filed: Jul. 20, 1979

Related U.S. Application Data

[62] Division of Ser. No. 933,986, Aug. 16, 1978, Pat. No. 4,259,222.

[51] Int. Cl.³ .................. C08K 5/52; C08L 67/02
[52] U.S. Cl. .................. 428/395; 528/167; 528/169; 528/287; 528/398; 528/400; 260/928; 260/929; 260/930; 260/45.95 G; 260/45.85 T; 428/920; 428/921; 428/277
[58] Field of Search .............. 528/167, 169, 287, 398, 528/400; 260/928, 929, 930, 45.95 G, 45.85 T, 45.7 PH; 428/395, 394, 920, 921, 277

[56] References Cited

U.S. PATENT DOCUMENTS 4,094,926 6/1978 Sheard et al. .................. 260/930
4,123,420 10/1978 Ikyo et al. .................. 260/860

*Primary Examiner*—John Kight, III
*Assistant Examiner*—Amelia B. Yarbrough
*Attorney, Agent, or Firm*—Andrew E. Pierce

[57] ABSTRACT

The present invention provides new linear phosphorus- and halogen-containing flame retardant polyester additives for normally flammable polymers and coatings for normally flammable natural and synthetic films and fibers, for instance, polyester and cellulose ester films and fibers. The phosphorus- and halogen-containing polymers of the invention are water dispersible or can be rendered water-soluble. They can be prepared by reacting a phosphorus acid reactant such as phosphoric acid with at least one halogenated difunctional monomer. The water-soluble polyesters can be cross-linked to render them insoluble in water by heating together with a methylol compound.

Said halogenated monomer is preferably an oxyalkylated diacid or diol and said halogen is attached either on one or more aromatic rings or on a cycloaliphatic ring. The halogenated diols useful in preparing the flame-retardant polymer additives of the invention are selected from the group consisting of at least one of the halogenated, saturated diols having the formula:

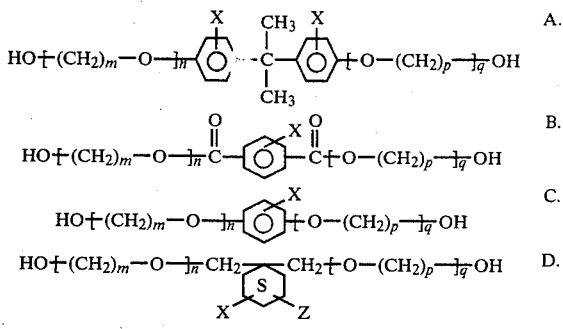

wherein m and p are integers of 2 to 6; n and q in formulas A, C, and D are 0 or integers of 1 to 10 and integers of 1–10 in formula B; wherein in formulas A–C, X which is attached to an aromatic ring represents 1 to 4 halogen atoms; and wherein in formula D, X represents 1 to 2 halogen atoms and Z is hydrogen, a $C_1$–$C_6$ alkyl radical, or phenyl.

Polymer fibers and films such as those made from polyethylene terephthalate and cellulose ester fibers and films such as those prepared from cellulose acetate and cellulose triacetate, each containing a flame-retardant amount of the phosphorus- and halogen-containing flame-retardant polymer additives of the invention are resistant to loss of the polymeric flame-retardant additives of the invention during use.

4 Claims, No Drawings

LINEAR SATURATED POLYESTERS OF PHOSPHORIC ACID AND HALOGENATED DIOLS AS FLAME-RETARDANT ADDITIVES AND COATINGS

This is a division, of application Ser. No. 933,986, filed Aug. 16, 1978, now U.S. Pat. No. 4,259,222.

BACKGROUND OF THE INVENTION

1. Field of the Invention

This invention relates to flame-retardant polymer compositions and to novel polymeric flame-retardant polymer additives and coatings for polymers in such forms as films and fibers and to processes for the preparation of said flame-retardant additives and coatings and non-burning fibers and films containing said flame-retardant additives and coatings.

More particularly, this invention relates to self-extinguishing and non-burning compositions comprising a normally flammable, linear high molecular weight polyester and a phosphorus- and halogen-containing flame-retardant polymer additive or coating.

2. Description of the Prior Art

It has long been considered desirable to impart flame-retardant qualities to polyester fibers and fabrics particularly those containing blends of polyester and natural fibers such as cotton and rayon so that they might be rendered non-burnable. Commercially, fiber forming polymers are prepared, for example, by the condensation of terephthalic acid or dimethyl terephthalate and a polymethylene glycol containing from about 2 to about 10 carbon atoms, particularly ethylene glycol, in accordance with U.S. Pat. No. 2,465,319. Fibers prepared therefrom are known to be rendered flame-retardant by incorporating therein polymeric or non-polymeric flame-retardant additive compounds by melt blending said additives with said polyester prior to formation of fibers and films by extrusion. A compound which has been suggested for the production of copolyester fibers and films having improved flame-retardance is 2,2-bis-[4,(2-hydroxyethoxy)-3,5-dibromophenyl]propane. Generally, 1 to 2 percent by weight of antimony oxide can be added to the flame-retardant films and fibers to further increase the flame-retardancy.

Alternatively, flame-retardant compounds such as tris(2,3-dibromopropyl)-phosphate have been extensively used either alone or in combination with other flame-retardant additives as flame-retardant coatings on fibers and films. The use of such non-polymeric flame-retardant additives is disadvantageous. The molecular entanglement that takes place with polymeric flame-retardant compounds does not take place with non-polymeric additives because of the relatively small size of these molecules. Relatively easy removal of these additives during use or upon washing in aqueous media thus results.

It is known to prepare flame-retardant unsaturated polyesters having phosphorus incorporated into the polyester chain and containing halogen derived from a halogenated dicarboxylic acid or halogen-substituted polyol as disclosed in U.S. Pat. Nos. 3,433,854 and 3,365,424. In addition to the use of flame-retardant additives and coatings to render polyesters flame-retardant, it is known to render cellulose acetate and cellulose triacetate flame-retardant for use in children's clothing and sleepwear, carpets and draperies, etc.

Because the extensively used tris(2,3-dibromopropyl)phosphate is considered to be carcinogenic, search continues to find improved additives capable of imparting flame-retardant properties to films and fibers of polyester and cellulose esters. Phosphorus- and halogen-containing polymers suitable for use as flame-retardant additives for normally flammable polymers are known from U.S. Pat. Nos. 4,030,933; 4,029,721; and German Offen. No. 2,608,785. However, there is no disclosure in the prior art of water-dispersible or water-soluble phosphorus- and halogen-containing polyesters capable of imparting flame-retardancy to normally flammable polymers.

SUMMARY OF THE INVENTION

It is a primary object of this invention to provide phosphorus- and halogen-containing linear polymers free of reactive unsaturation which are organic solvent soluble or dispersible in an aqueous medium and can be rendered water-soluble by neutralization with a base. Typically, the compounds can be cured or cross-linked utilizing a methylol compound so that following application as a coating to the film or fibers of a mixture of a methylol compound and the phosphorus- and halogen-containing polymers of the invention, cross-linking occurs upon the application of heat for the required time. Thus the novel halogen- and phosphorus-containing compounds of the invention when applied as coatings to normally flammable polymer films and fibers such as polyesters based upon the reaction of terephthalic acid or dimethylterephthalate and a polymethylene glycol or cellulose esters such as cellulose acetate and cellulose triacetate, provide flame-retardant compounds which are durable to washing and drycleaning and not susceptible to loss by exudation such as is the case with certain non-polymeric flame-retardant additives of the prior art.

Generally, the flame-retardant compounds of the invention exhibit the characteristic of being readily emulsifiable in aqueous media containing a small amount of a surface active agent and upon neutralization with a base exhibit the characteristic of water-solubility at ambient or elevated temperatures. The compositions are thus readily applied to films or fibers of normally flammable polymers.

The halogenated phosphorus-containing polyesters of the invention are preferably derived from halogenated diols which have been oxyalkylated prior to esterification utilizing a substantial amount of phosphorus acid reactant such as phosphorus pentoxide or phosphoric acid. In the esterification reaction, as is conventional, a mixture of non-halogenated diols can be utilized in addition to the required halogenated ethoxylated diols and phosphorous acid reactant. Up to 20 percent on a molar basis of other non-halogenated oxyalkylated dicarboxylic acids and oxyalkylated and non-oxyalkylated diols can be used in combination with the preferred halogenated oxyalkylated diol. Preferably ethoxylated diol reactants are utilized in the preparation of the halogenated phosphorus-containing flame-retardant polymers of the invention.

However, halogenated diols can be reacted directly without alkoxylation with a phosphorus acid reactant such as orthophosphoric acid, phosphorus pentoxide, or mixtures thereof, i.e., (polyphosphoric acid). In one embodiment of a polymer of the invention, a halogenated oxyalkylated aromatic diacid is utilized. Utilizing this reactant, the halogen can be incorporated in the polyester either by utilizing this reactant alone or in combination with other halogenated diols either alkoxylated or utilized directly in the reaction with phosphoric acid. The phosphorus- and halogen-containing polymer additives and coatings of the invention are selected from the group consisting of at least one of A. a polymer comprising the reaction product of a phosphorus acid reactant and a halogenated bis-hydroxyalkyl aromatic diol or a non-oxyalkylated halogenated aromatic diol or mixtures thereof having the formula:

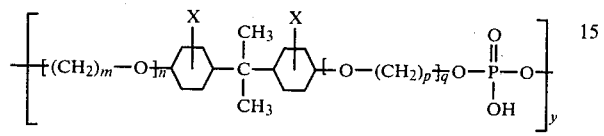

wherein X attached to the aromatic ring represents 1 to 4 halogen atoms; m and p are integers of 2 to 6; n and q are 0 or integers of 1 to 10; and y is an integer of 2 to 100;

B. a polymer comprising the reaction product of a phosphorus acid reactant and a halogenated bis-hydroxyalkyl aromatic diacid having the formula:

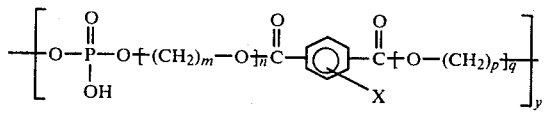

wherein said diacid is selected from the group consisting of phthalic, isophthalic, and terephthalic acids, phthalic anhydride, and esters thereof and wherein X attached to the aromatic ring represents 1 to 4 halogen atoms selected from the group consisting of bromine, chlorine, and mixtures thereof; m and p are integers of 2 to 6; n and q are integers of 1 to 10; and y is an integer of 2 to 100;

C. a phosphorus- and halogen-containing polymer comprising the reaction product of a phosphorus acid reactant and either a bis-hydroxyalkyl halogenated dihydroxy benzene or a non-oxyalkylated halogenated dihydroxy benzene and mixtures thereof having the formula:

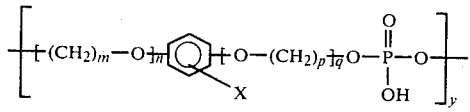

wherein the X attached to the aromatic ring represents 1 to 4 halogen atoms selected from the group consisting of bromine, chlorine, and mixtures thereof; m and p are integers of 2 to 6; n and q are 0 or integers of 1 to 10; and y is an integer of 2 to 100, and D. a phosphorus- and halogen-containing polymer comprising the reaction product of a phosphorus acid reactant and either a halocyclohexane 1,1-dimethanol or oxyalkylated derivative thereof and mixtures thereof having the formula:

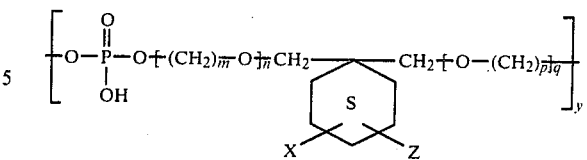

wherein the X attached to the saturated ring represents 1 to 2 halogen atoms selected from the group consisting of chlorine, bromine and mixtures thereof; Z represents hydrogen, an alkyl radical having 1 to 6 carbon atoms or phenyl; m and p are integers of 2 to 6; n and q are 0 or integers of 1 to 10; and y is an integer of 2 to 100.

The phosphorus- and halogen-containing polymers of the invention in addition to having utility when applied as coatings for films and fibers as indicated above, can be utilized as additives for normally flammable polymers by admixing the phosphorus- and halogen-containing polymers of the invention therewith under conditions such that the components are melted at the time that mixing occurs. Particularly satisfatory results are obtained by admixing the polymers of the invention with ethylene terephthalate polymers or cellulose esters. Thus, the polymers of the invention provide flame-retardant textile fibers, for instance, flame-retardant ethylene terephthalate polymer fibers by melting and mixing with the molten ethylene terephthalate polymer the halogen- and phosphorus-containing polymers of the invention. Alternatively, the organic solvent solubility, water dispersibility or water-solubility characteristics and the potentially curable properties of the polymers of the invention can be taken advantage of where the polymers of the invention are applied as coatings to normally flammable substrates.

Generally the amount of phosphorus- and halogen-containing polymer of the invention which is utilized as a coating on a normally flammable polymer substrate such as a natural or synthetic fabric, film or fiber is a flame-retardant amount up to about 25 percent by weight based on the weight of the film or fiber substrate which is coated, preferably a coating weight of a flame-retardant amount up to about 20 percent by weight based on the weight of the substrate is utilized. Generally, where the phosphorus- and halogen-containing polymers of the invention are incorporated as melt-additives in a flame-retardant amount into a normally flammable polymer by a melt-blending process, the proportion of the phosphorus- and halogen-containing polymer of the invention utilized therein is a flame-retardant amount up to about 25 percent by weight based on the weight of the normally flammable polymer. Preferably a flame-retardant amount up to about 20 percent by weight is used.

DETAILED DESCRIPTION OF THE INVENTION AND OF THE PREFERRED EMBODIMENTS

A. Flame-Retardant Polymers Derived From Halogenated 2,2-Bis-Hydroxyphenyl Propane The phosphorus- and halogen-containing fire retardant additives or coatings of the invention can be ester derivatives of 2,2-bis(4-hydroxyphenyl)propane and a phosphorus acid reactant or esters derived from the reaction of 2,2-bis[4-(2-hydroxyalkoxy)halophenyl]propane with a phosphorus acid reactant. Methods for obtaining the oxyalkylated halogenated diols are described in U.S. Pat. No. 3,909,482, incorporated herein by reference.

The esterification reaction is generally conducted by combining the halogenated diol and phosphorus acid reactant, i.e., phosphoric or polyphosphoric acid, at a temperature at which the diol is a liquid and heating the mixture to condense the ester, water being removed as the condensation process proceeds, the temperature generally being maintained between 150° C. and 250° C. over a period of time from about 10 hours to about 16 hours. The ester is obtained without utilizing a catalyst in addition to the phosphorus acid reactant utilized as a reactant.

While any halo-substituted 2,2-bis(4-hydroxyphenyl)-propane, or alkoxylated derivative thereof containing 1 to 4 halogens can be utilized to prepare the phosphorus- and halogen-containing polymers of the invention, a preferred flame-retardant polymer is obtained by reacting a tetrabrominated ethoxylated derivative thereof, namely, 2,2-bis[4-(2-hydroxyethoxy)-3,5-dibromophenyl]propane. This is a commercially available product, sold under the designation "XN-6070" by the Dow Chemical Company having the following typical properties: bromine content, about 50 percent; molecular weight, about 650; hydroxyl content, about 5.2 percent; and acid number less than 0.5.

The halogen- and phosphorus-containing polyester compositions of the invention useful as a flame-retardant additive or coating generally contain, based upon the sum of the theoretical mole percentages of all the components of said polyester about 30 to about 50 percent of the phosphorus acid reactant, about 30 to about 50 mole percent of the alkoxylated halogenated dicarboxylic acids, alkoxylated or nonalkoxylated halogenated diols and optionally up to about 20 mole percent of an alkoxylated or non-alkoxylated nonhalogenated diol, dicarboxylic acids or mixtures thereof.

Examples of non-halogenated dicarboxylic acids useful when oxyalkylated are phthalic, terephthalic, isophthalic, adipic, azelaic, sebacic, 1,3-cyclopentane dicarboxylic, 1,2-cyclohexane dicarboxylic, 1,3-cyclohexane dicarboxylic, 1,4-cyclohexane dicarboxylic, 2,5-norbornane dicarboxylic, 1,4-naphthalic, diphenic, 4,4'-oxydibenzylic, 4,4'-sulfonyldibenzoic, diglycolic, thiodipropionic, and 2,5-naphthylene dicarboxylic acids. Because of their known contribution to film strength in polyesters, the aromatic diacids such as isophthalic acid or terephthalic acid are preferred. Where the flame-retardant polymer is to be utilized in admixture with or as a coating for poly(ethylene terephthalate) films and fibers, the use of isophthalic and terephthalic acids in the preparation of the flame-retardant polyester of the invention promotes compatibility of the flame-retardant additive when incorporated into the fiber melt and also promotes adhesion when the flame-retardant polymer is utilized as a coating on the fiber.

Non-halogenated diols useful when oxyalkylated in the preparation of the flame-retardant polymers of the invention include, for instance, the aliphatic polyoxyalkylene glycols, polyethylene glycol, polypropylene glycol, polyethylene and polypropylene glycol mixtures, diethylene glycol, triethylene glycol, tetraethylene glycol, pentaethylene glycol, hexaethylene glycol, heptaethylene glycol, oxyethylene glycol, dipropylene glycol, and mixtures thereof. Preferably the polyoxyalkylene glycol is selected from the group consisting of diethylene glycol, triethylene glycol, and mixtures thereof.

Diols useful in the preparation of the flame-retardant polymers of the invention also include non-oxyalkylated aliphatic, cycloaliphatic and aromatic glycols. Representative examples include ethylene glycol, propylene glycol, 1,3-propane diol, neopentyl glycol, 1,3-butane diol, 1,5-pentane diol, 1,6-hexane diol, catechol, resorcinol, and hydroquinone. Preferred diols of this class are selected from the group consisting of ethylene glycol, propylene glycol and 1,4-butane diol.

B. Flame-Retardant Polymers Derived From Halogenated Bis-hydroxyalkyl, Aromatic Diacids, Anhydrides, and Esters The flame-retardant halogen- and phosphorus-containing polymers of the invention can be obtained by the reaction of at least one phosphorus acid reactant, i.e., polyphosphoric acid, orthophosphoric acid or phosphorus pentoxide with a halogenated alkoxylated aromatic diacid such as isophthalic, terephthalic or phthalic acid. The corresponding anhydride of phthalic acid and the esters of these diacids can also be utilized in forming the flame-retardant phosphorus- and halogen-containing polymers of the invention. Methods for the preparation of the alkoxylated derivatives of the halogenated aromatic diacids are known to the art and procedures are set forth in U.S. Pat. No. 3,652,647 which is incorporated herein by reference. Generally the process comprises reacting the halo-substituted aromatic diacid, for example, terephthalic acid with an alkylene oxide such as ethylene oxide at temperatures of from about 100° C. to about 200° C. in the presence of a finely divided basic catalyst. Although any chloro- or bromo-substituted aromatic diacid or mixtures thereof can be used, preferably dichloro-, dibromo-, tetrachloro- and tetrabromo-aromatic diacids or mixtures thereof are used as reactants. Tetrabromoterephthalic acid is particularly preferred as a reactant.

The aromatic diacids or aromatic diols are oxyalkylated with at least one of any suitable vicinal epoxide reactant having the formula:

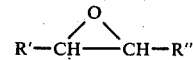

In this formula R' and R" are individually selected from hydrogen or an alkyl radical having from 1 to 8 carbon atoms. R" can also be a phenyl radical. Representative compounds include ethylene oxide, propylene oxide, 1,2-butylene oxide, 2,3-butylene oxide, 2,3-epoxypentane, 3,4-epoxyhexane, 2,3-epoxyheptane, and styrene oxide. Especially preferred are ethylene oxide, propylene oxide and mixtures thereof.

The oxyalkylation reaction can also be effected in the presence of a basic catalyst such as the oxides, hydroxides and organic salts of the alkali metal and alkaline earth metals. Typically, such catalysts are lithium, sodium, potassium, calcium, and barium hydroxides. The proportion of catalyst is usually between about 0.03 and about 1 percent by weight. Up to about 10 moles of the vicinal epoxide reactant per mole of halogenated reactant are employed in the oxyalkylation reaction.

The method of preparing the flame-retardant halogen- and phosphorus-containing polymers of the invention utilizing halogenated, alkoxylated aromatic diacids are described above. The proportions of said polymers utilized to confer flame-retardancy on a normally flammable polymer either when incorporated in the polymer melt or when utilized as a coating are those proportions disclosed above. As is the case with the polymers prepared under section A above, up to 20 percent of other non-halogenated dicarboxylic acids and non-halogenated diols can be utilized in the preparation of the halogen- and phosphorus-containing flame-retardant polymers of the invention made using halogenated aromatic diacids.

As previously noted, the halogenated reactants and phosphorus acid reactants of the invention are generally reacted in an equimolar ratio although other non-halogenated aromatic aliphatic and cycloaliphatic diols and dicarboxylic acids can be included as reactants up to the proportion of about 20 molar percent of the total molar percent of acid or diol reactant used in preparing the polyester. Representative non-halogenated dicarboxylic acids and diols are the same as those compounds listed above.

Generally the esterification reaction is conducted by melting the reactants together and further heating at temperatures and times well known to the art to conduct the polymerization. The monomers can also be reacted in the presence of a solvent which will dissolve each of the monomers or which is at least compatible with each monomer. Said solvents include benzene, pyridine, methylene chloride, dichloroethane, tetrahydrofuran, dioxane, and mixtures thereof. Generally sufficient solvent should be present so as to dissolve the monomers and therefore the reaction mixture where solvents are used, can contain a solvent generally in the amount of about 2 to about 50 percent by weight, preferably about 5 to about 40 percent by weight and most preferably about 8 to about 25 percent by weight based on the weight of the monomeric reactants.

The reaction temperature for the polyesterification is generally high enough so that the condensation reaction takes place at a practical rate, yet low enough to avoid decomposition of the reactants. In the case of conducting the condensation in the presence of a solvent, the temperature must be low enough to avoid volatilizing the solvent or the solvent can be periodically replaced to make up for solvent evaporation. Generally temperatures of about $-20°$ to about $250°$ C., preferably about $0°$ to about $200°$ C. and more preferably about $25°$ C. to about $150°$ C. are used to conduct the reaction.

The reaction can be conducted at any convenient pressure, for instance, subatmospheric, atmospheric or superatmospheric pressure, however, the pressure is generally maintained at about 0.01 to about 100 atmospheres, preferably from about 0.1 to about 50 atmospheres, and most preferably about 0.5 to about 20 atmospheres. Although the reaction time is dependent upon the nature of the reactants, the concentration and the reaction temperature, the reaction time for the formation of the flame-retardant polymers of the invention is generally about 2 to about 25 hours, preferably about 5 hours to about 15 hours, and most preferably about 5 hours to about 8 hours. Because the presence of oxygen as a gas in the reaction mixture generally leads to dark colored polyester products, the reaction is generally conducted under a blanket of inert gas such as nitrogen. The removal of water from the reaction mixture can be facilitated by bubbling an inert gas such as nitrogen, argon, carbon dioxide or the like through the reaction mixture during the reaction period.

The halogen- and phosphorus-containing products of the invention range from white to tan glassy solids to white to tan resinous materials. The compounds generally have melting points between about $100°$ C. to about $200°$ C. In the free acid form of the polymer, various representative organic solvents such as acetone, methylene chloride, benzene, xylene, dichloroethane, tetrahydrofuran, and mixtures thereof are useful solvents for the polymer and can be used to prepare coating solutions useful in applying the polymer to flammable substrates such as natural and synthetic polymers, for instance, films, fibers, and fabrics.

While solvents can also be used in combination with the reactants, melt polycondensation of the reactants is preferred where the melting range and temperature stability of the halogenated reactant permits melt polycondensation. Use of the phosphorus acid reactant of the invention generally permits the production of light colored products at moderately high temperature reaction conditions where substitution of the phosphorus acid reactant of the invention by other phosphorus containing reactants known in the prior art would produce dark-colored products under similar conditions of reaction.

The phosphorus- and halogen-containing polymers of the invention as described hereinbefore have widely varying molecular weights. Thus the polymers can be oligomers (that is where the degree of polymerization is from 2 to about 4) or polymers containing up to 100 or more repeating units. Preferably, the polymers contain about 3 to about 100 repeating units and most preferably contain about 3 to about 50 repeating units.

The polymers as produced by the above described process are characterized as in the form of the "free-acid". That is, the polymers are not soluble in water but are soluble in organic solvents such as methylene chloride, benzene, xylene, tetrahydrofuran, etc. The polymers can be solubilized by reacting the free-acid form of the polymer with a base. Thus the polymer can be added to water containing a base such as an alkali metal hydroxide, bicarbonate, or carbonate, i.e., sodium bicarbonate, or ammonia or an amine and the free-acid form of the polymer thus neutralized and rendered soluble in water. The use of a small amount of non-ionic surfactant often aids the solubilization process.

The halogen- and phosphorus-containing polymers of the invention have an intrinsic viscosity generally of about 0.05 to about 1.0, preferably a viscosity of about 0.1 to about 0.6, and most preferably a viscosity of from about 0.2 to about 0.5. The intrinsic viscosity of these polymers can be determined by dividing the viscosity of a dilute solution of the polymer by the viscosity of the solvent employed, where these viscosities are measured at the same temperature, and dividing the product by the polymer concentration in the solution, where this concentration is expressed in grams per hundred milliliters.

The halogen- and phosphorus-containing polymers of the invention generally have weight average molecular weights of from about 200 to about 15,000, preferably about 1,000 to about 12,000, and most preferably about 3,000 to about 6,000. The acid number of the polymers of the invention generally is about 30 to about 150, preferably about 50 to about 125 and more preferably about 80 to about 100.

The polymers contain halogen in the amount of about 8 to about 60 percent, preferably about 10 to about 40 percent, and most preferably about 20 to about 35 percent by weight. The polymers contain phosphorus in the amount of about 10 to about 20 percent, preferably about 10 to about 15 percent and most preferably about 10 to 12 percent by weight based upon the weight of the polymer.

The process for producing the halogen- and phosphorus-containing polymers of the invention provides a product in substantially quantitative yield, however the yield is frequently less than 100 percent because of losses which occur during washing and other purification procedures.

C. Phosphorus- and Halogen-Containing Fire Retardant Polymers Derived From Halogenated Dihydroxy Benzenes.

The flame-retarding phosphorus- and halogen-containing linear polyesters of the invention can be prepared by reacting a phosphorus acid reactant with either halogenated oxyalkylated or non-oxyalkylated aromatic dihydroxy diphenols. The phosphorus acid reactant can be at least one of orthophosphoric acid, polyphosphoric acid, and phosphorus pentoxide. The procedures for oxyalkylation, the reactants utilized, and the esterification process are the same as those described above. Any halo-substituted dihydroxy benzene can be utilized in the polyesterification or used to prepare the oxyalkylated halogenated reactants which can be used in the polyesterification to prepare the phosphorus- and halogen-containing linear polyesters of the invention, however chloro- and bromo-substituted diphenols are preferred and especially preferred are the tetrachloro- and tetrabromo-substituted dihydroxy benzenes. Useful dihydroxy benzenes include resorcinol, catechol, and hydroquinone.

D. Flame-Retardant Linear Polyesters Derived From a Halogenated Cyclohexane Dimethanol or Oxyalkylated Derivatives Thereof Flame-retardant polymers of the invention are derived from halogenated diols in which the halogen is attached to a saturated hexagonal ring. These can be reacted with a phosphorus acid reactant, as previously defined, where the diol is oxyalkylated or non-oxyalkylated. The procedures and proportions of reactants used in preparing the oxyalkylated diols are disclosed in U.S. Pat. No. 3,907,722, incorporated herein by reference. Representative reactants utilized in the preparation of the linear flame-retardant polyester are the same as those described above. The dichloro- and dibromo-substituted ethoxylated cyclohexane 1,1-dimethanols are preferred with the dibromo-derivative being particularly preferred as a reactant.

Utilization of the halogen- and phosphorus-containing linear polyester flame-retardant in normally flammable polymers Numerous examples exist in the art of flame-retardant additives prepared by reacting various phosphorus-containing compounds with both halogenated and non-halogenated aromatic compounds. Thus phosphorus-containing compounds such as phenylphosphonic dichloride, phosphorus oxychloride, triaryl phosphates, alkyl dihalodiphosphates, diphenylalkyl phosphates, phosphonyl dichlorides, diphenyl methyl phosphonates, and cyclohexylphosphonic dichloride have been utilized in the prior art in the preparation of flame-retardant compositions.

The use of a phosphorus acid reactant in the preparation of the compounds of the instant invention, said acid consisting of phosphoric acid, polyphosphoric acid and phosphorus pentoxide is particularly advantageous in the preparation of flame-retardant polyester coatings and additives. The phosphorus acid reactant can be reacted with halogen-containing oxyalkylated diacids or aromatic and cycloaliphatic diols. The diol can be oxyalkylated prior to reaction with the phosphorus acid reactant in order to improve the physical properties of the flame-retardant additive by modification of the polymer chain or to promote the reaction of the diol with the phosphorus acid reactant. Whether or not the halogenated aromatic or cycloaliphatic diol is oxyalkylated, the reaction procedure with the phosphorus acid reactant is substantially the same and is similar to methods well known in the art for the preparation of linear polyesters.

It is to be noted that the linear polyesters of the invention do not contain reactive unsaturation in the polymer chain and the use of a phosphorus acid reactant to produce the polymers of the invention is particularly advantageous as there is avoided thereby the concurrent use of other acid acceptors which have been used in the prior art during the preparation of polyesters. For instance, such phosphorus-containing compounds as phosphorus oxychloride, triaryl phosphates and alkyl dihalophosphates have been used in order to avoid or reduce the tendency for the formation of colored reaction products. In contrast, the reaction products obtained by the process of the invention are generally moderately colored and can be obtained in high yield at relatively high reaction temperatures in relatively short reaction times.

In addition, the use of a substantial amount of a phosphorus acid reactant to produce the polymers of the invention is advantageous because said polymers are thus rendered readily dispersible in water utilizing a small amount of a known anionic, cationic, or non-ionic surface-active agent or, upon neutralization with a base, are soluble in water. The flame-retardant polymers of the invention thus can be applied as fabric finishes for polyester, cellulose ester and other fabrics utilizing conventional textile finishing equipment. Additional durability to washing and dry-cleaning can be obtained in fibers and fabrics rendered flame-retardant by the halogen- and phosphorus-containing polymers of the invention by utilizing with said flame-retardant polymer a methylol compound such as dimethylolmelamine generally in the amount of about 0.1 to about 1.5 percent by weight based upon the weight of the fiber, or alternatively, generally about 5 percent to about 10 percent by weight on the weight of the flame-retardant polymer composition. Upon the application of heat to the coated fibers and fabrics, cross-linking results with attendant increased durability of the coating to removal by washing and dry-cleaning processes.

Generally, a flame-retardant coating amount up to about 25 percent, preferably up to about 20 percent, and most preferably up to about 15 percent, all by weight and based upon the weight of the fiber or fabric of the flame-retardant halogen- and phosphorus-containing polymers of the invention provides a desirable flame-retardant level in fabrics intended for such use as sleepwear, that is, to produce fabrics which will pass the standard DOC FF 3-71, which became effective in 1972. Where lesser standards of flame-retardancy are permissible, the preferred flame-retardant amount of polymer coated onto the fibers or fabric is a flame-retardant amount up to about 10 percent by weight and the most preferred amount of flame-retardant polymer is a flame-retardant amount up to about 4 percent by weight based upon the fiber weight.

The halogen- and phosphorus-containing polymers of the invention are suitable for imparting flame-retardancy to normally flammable polymers either by incorporating the polymers of the invention in said normally flammable polymers or by coating the surface of said polymers, for instance, where said polymers are utilized as films or fibers. Because the polymers of the invention contain both halogen and phosphorus in the molecule, it is possible to utilize lesser quantities of the polymers of the invention, than is the case with conventional prior art flame-retardant additives containing only halogen or only phosphorus in the molecule. Such prior art halogen-containing, flame-retardant additives often require, for maximum effectiveness, the incorporation of several percent of antimony oxide. The neutralized polymers of the invention are particularly suited for incorporation into synthetic linear polyester compositions, particularly poly(ethyleneterephthalate) and poly(tetramethyleneterephthalate). These are normally flammable polymers as indicated by the deficiency in their ability to resist ignition upon application of flame as well as in the deficiency in their ability to self-extinguish. This flammability renders these commercially available polyesters unsuitable in many applications particularly those applications involving end uses such as children's clothing, sleepwear, carpets, sheets, and draperies.

Many of the prior art monomeric low molecular weight halogen- or halogen- and phosphorus-containing compounds utilized as flame-retardant additives for normally flammable polymers by melt blending into the molten polymers, are disadvantageous because of the incompatibility of the flame-retardant additive compound. Said compound is thus potentially removable by slow exudation and also often acts as a plasticizer for the polymer when in a flame-retardant amount such that the melting point of the polymer is lowered and products made therewith, i.e., fibers, have poor physical properties.

Use of the halogen- and phosphorus-containing polyester flame-retardant compositions of the invention overcomes the above disadvantages and provides flame-retardant polymers such as terephthalic acid based fiber forming polyester having good physical properties. The polymers of the invention are more effective as flame-retardant additives since the presence in the molecule of both phosphorus and halogen results in a synergistic action with respect to flame-retardancy, thus allowing lesser amounts of the additive to be utilized to obtain flame-retardancy than would be required with prior art flame-retardant additives. In addition, flame-retardancy is obtained with the polymers of the invention without the additional use of the opacifying, commonly used, antimony oxide.

The halogen- and phosphorus-containing flame-retardant polymers of the invention are also useful in providing flame-retardant thermoplastic compositions which are useful, for instance, in injection molding, compression molding, transfer molding, extrusion, film formation and the like. Representative compositions include polymers such as polyethylene, polypropylene, polystyrene, polyamide, and polyacetals. These can be satisfactorily rendered flame-retardant by the incorporation, such as by a melt-blending process, of the neutralized halogen- and phosphorus-containing flame-retardant polymers of the invention.

Generally polyester textile filaments can be produced which are flame-retardant by melting and mixing with the molten ethyleneterephthalate fiber forming polymer prior to extruding the molten polymer to form filaments. Adequate flame-retardancy is obtained without significantly affecting the physical propeties of the fibers. Fabrics containing the filaments are durable to conventional scouring, atmospheric and pressure dyeing, home laundering and commercial dry-cleaning.

Because of the polymeric nature of the halogen- and phosphorus-containing flame-retardants of the invention, satisfactory spinning of the fibers including said additives can be accomplished without the heat stability problems which have arisen utilizing the low molecular weight flame-retardant additives of the prior art which cause the spinning pack pressure to rise so rapidly during extrusion that the spinning process rapidly becomes inoperable.

Mixing the neutralized phosphorus- and halogen-containing polymers into the polyester prior to extrusion to form fibers is readily accomplished by forming a melt-blend with the fiber forming polyester. Preferably the flame-retardant polymer of the invention is melted and injected into a stream of molten fiber forming polyester. Mixing is suitably accomplished utilizing a conventional 4-stage helical blade mixer but adequate mixing can also be accomplished by passing the flame-retardant polyester of the invention through the pump utilized to move the molten polyester to the spinning pack for extrusion.

As indicated above, the amount of halogen- and phosphorus-containing polymer required for flame-retardancy generally is a flame-retardant amount up to about 4 percent to a flame-retardant amount up to about 25 percent by weight based upon the weight of the normally flammable polymer to which the flame-retardant polymer is added. This corresponds to phosphorus and halogen contents respectively from about 0.1 to about 2.0 percent by weight and 1 to about 20 percent by weight based upon the weight of the normally flammable polymer.

Definition of Terms and Test Methods

The terms "non-burning", "non-flammable", and "self-extinguishing" are used herein interchangeably to connote the tendency of a composition, shaped article or product made therefrom to self-extinguish in air upon removal of the flame source. Normally flammable terephthalate based polyesters and cellulose ester fibers and films are completely consumed within seconds of being ignited by a match when such fibers or films are tested, for instance, utilizing a ½ inch by 6 inch section held in a vertical position during ignition. Upon the addition of flame-retardant amounts of the halogen- and phosphorus-containing polymers of the invention either as melt-additives or as coatings for the fibers or films of said polyesters or cellulose esters, such films are rendered non-burning or "self-extinguishing". Reference is made to ASTM Test Method D-635 and Underwriters Laboratories Bulletin No. 94 for further details of test methods used to qualify fibers or films or non-burning or self-extinguishing. Both of the above standards are hereby incorporated by reference.

The term "flame-retardant" is used to indicate that the resistance of a composition to combustion is significantly increased in comparison with control samples. A convenient direct method of combustibility is the oxygen index test described in ASTM Test Method D-2863 which is incorporated herein by reference. Generally in this method of testing, appropriate specimens are placed in a combustion chamber and the oxygen atmosphere in the chamber is reduced step-wise until the material which has been previously ignited no longer supports a flame. Oxygen index is reported as the percent oxygen required to support combustion times 100 divided by the sum of the percentages of nitrogen and oxygen in the gas used to burn the material under test.

The following examples illustrate the various aspects of the invention but are not intended to limit it. When not otherwise specified throughout the specification and claims, temperatures are given in degrees centigrade and parts, percentages, and proportions are by weight.

EXAMPLE 1

This example illustrates the procedure for preparing a halogen- and phosphorus- containing polymer of the invention derived from the reaction of polyphosphoric acid and a halogenated diol, i.e., 2,2-bis[4-(2-hydroxyethoxy)-3,5-dibromophenyl] propane.

To a one liter flask equipped with an oil immersion heating bath, stirrer, viscometer, nitrogen sparge tube, thermometer and thermometer well and including a vacuum take-off head, there was charged 455 grams of 2,2-bis[4-(2-hydroxyethoxy)-3,5-dibromophenyl] propane sold as "Dow XN-6070" by the Dow Chemical Corporation under the description 2,2-isopropylidine (dibromophenyleneoxy)-polyethoxylate. To this there was then added 640 milliliters methylene chloride. The mixture was heated under a nitrogen atmosphere to a temperature of 50° C. so as to dissolve the solid material and form a homogeneous low viscosity liquid. To this mixture there was then added 59.7 grams of polyphosphoric acid. Heating was continued and a vigorous nitrogen sparge initiated. At a temperature of 165° C., water of condensation was obtained by distillation from the reaction mixture and was collected in a separate flask. After 2 hours the pressure was reduced to about 1 millimeter of mercury for the remainder of the condensation reaction. The reaction temperature was slowly increased to 220° C. over a period of 10 hours during which time the acid number decreased from 144 to 93.7. The vacuum was then relieved with nitrogen and the syrupy tan-colored product was poured onto a Teflon sheet. Upon cooling, a brittle polymer was formed having a weight average molecular weight of about 4500 and an acid number of 93.7 which was dissolved in 0.1 Normal sodium hydroxide to produce a 20 percent solids solution.

EXAMPLES 2–3

Example 1 is repeated substituting on a molar basis in turn orthophosphoric acid and phosphorous pentoxide to produce flame-retardant additives of the invention.

EXAMPLES 4–6

Examples 1, 2, and 3 are repeated replacing 20 mole percent of the halogenated diol with an equal mole percent of diethylene glycol to produce flame-retardant additives of the invention.

EXAMPLES 7–11

Example 1 is repeated using successively oxyalkylated tetrachloroterephthalic acid prepared by reacting 2 moles of ethylene oxide with 1 mole of the halogenated diacid; resorcinol, oxyalkylated using 2 moles of ethylene oxide with 1 mole of resorcinol; hydroquinone; dibromohydroxy-ethyl cyclohexane 1,1-dimethanol; and dibromo cyclohexane 1,1-dimethanol to produce flame-retardant additive compositions of the invention.

EXAMPLES 12–16

Examples 7–11 are repeated except that 20 mole percent of halogenated reactant is replaced with an equimolar amount of triethylene glycol to produce flame-retardant additive compositions of the invention.

EXAMPLES 17–26

Aqueous solutions, dispersions, and organic solvent solutions of the flame-retardant additive compositions of Examples 7–16 are prepared. Representative useful organic solvents are dichloroethane and methylene chloride.

EXAMPLE 27

Utilizing the aqueous solutions, dispersions, and organic solvent solutions of the flame-retardant additives of Examples 17–26, polyester, nylon, cellulose acetate and polyethylene fabrics are treated to render said fabrics flame-retardant.

EXAMPLES 28–37

To the aqueous solutions of Examples 17–26 there are added 10 percent by weight dimethylol melamine based upon the weight of the flame-retardant additives. These are in turn applied to the synthetic fabrics of Example 27 to render said fabrics flame-retardant.

What is claimed is:

1. The process of producing a flame-retardant polyester textile fiber comprising coating a polyester fiber with an organic solvent solution, an aqueous dispersion, or an aqueous solution of a phosphorus- and halogen-containing polymer selected from the group consisting of at least one of
   A. a saturated polyester comprising the reaction product of a phosphorus acid reactant and either a halogenated bis-hydroxyalkyl aromatic diol or a non-oxyalkylated halogenated aromatic diol or mixtures thereof having the formula:

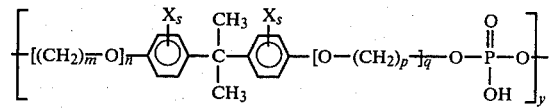

wherein X attached to the aromatic ring represents a halogen atom; s is an integer of 1 to 4; m and p are integers of 2 to 6; n and q are 0 or integers of 1 to 10; and y is an integer of 2 to 100;
   B. a saturated polyester comprising the reaction product of a phosphorus acid reactant and a halogenated bis-hydroxyl aromatic diacid having the formula:

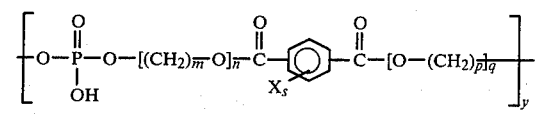

wherein said diacid is selected from the group consisting of phthalic, isophthalic, and terephthalic acids, phthalic anhydride, and esters thereof and wherein X attached to the aromatic ring represents a halogen atom selected from the group consisting of bromine, chlorine, and mixtures thereof; s is an integer of 1 to 4; m and p are integers of 2 to 6; n and q are integers of 1 to 10; and y is an integer of 2 to 100;

C. a saturated polyester comprising the reaction product of a phosphorus acid reactant and either a bis-hydroxyalkyl halogenated diphenol or a non-oxyalkylated halogenated dihydroxy benzene or mixtures thereof having the formula:

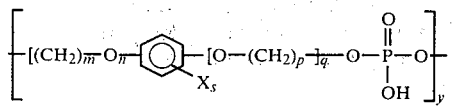

wherein the X attached to the aromatic ring represents a halogen atom selected from the group consisting of bromine, chlorine, and mixtures thereof; s is an integer of 1 to 4; m and p are integers of 2 to 6; n and q are 0 or integers of 1 to 10; and y is an integer of 2 to 100; and D. a saturated polyester comprising the reaction product of a phosphorus acid reactant product of a phosphorus acid reactant and either a halocyclohexane 1,1-dimethanol or oxyalkylated derivative thereof or mixtures thereof having the formula:

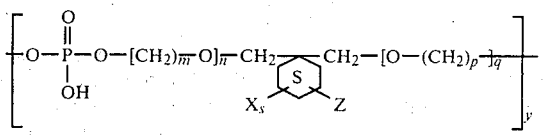

wherein the X attached to the saturated ring represents a halogen atom selected from the group consisting of chlorine, bromine and mixtures thereof; s is an integer of 1 to 2; Z represents hydrogen, an alkyl radical having 1 to 6 carbon atoms or phenyl; m and p are integers of 2 to 6; n and q are 0 or integers of 1 to 10; and y is an integer of 2 to 100.

2. The process of claim 1 wherein said fiber is coated with said phosphorus- and halogen-containing polymer in the proportion of a flame-retardant amount up to about 25 percent by weight based upon the weight of said fiber.

3. The process of claim 2 wherein said organic solvent solution, aqueous dispersion or aqueous solution contains a methylol compound in the proportion of about 5 percent to about 10 percent by weight based upon the weight of said phosphorus- and halogen-containing polymer.

4. The process of claim 3 wherein said methylol compound is dimethylolmelamine.

* * * * *